Aug. 26, 1924. 1,506,146
H. ZIEMSS, JR
AEROPLANE
Filed Feb. 12, 1919 2 Sheets-Sheet 2
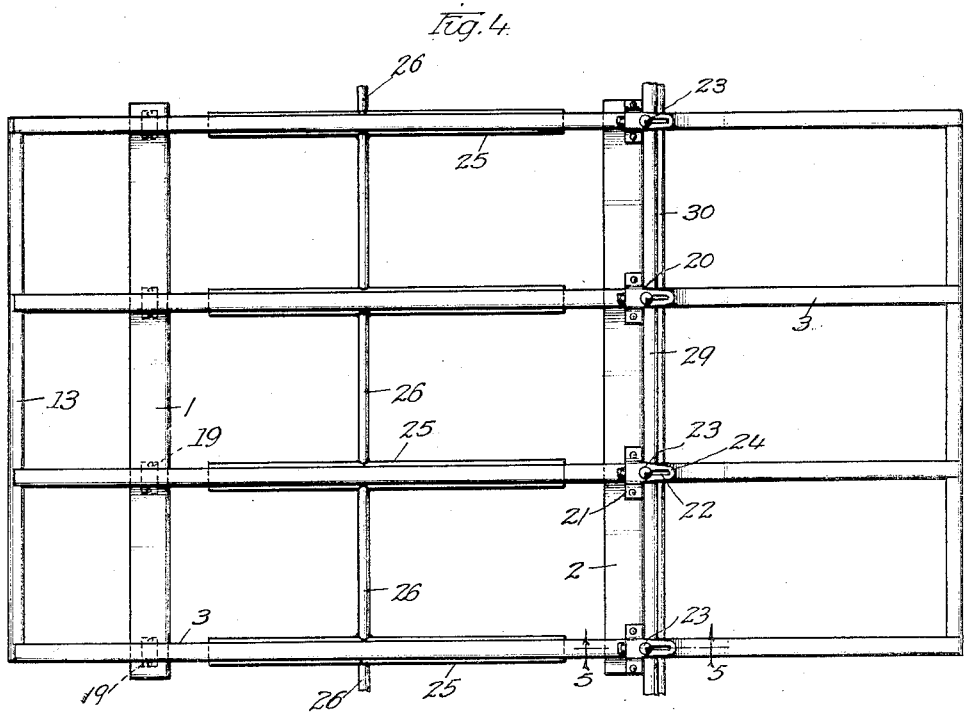
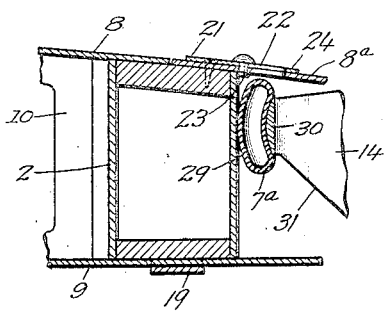
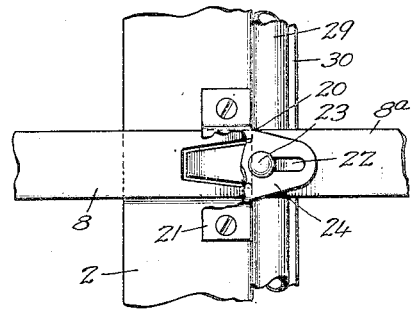
WITNESSES: INVENTOR
Henry Ziemss Jr
By Miller, Chindahl Parker
ATTORNEYS Patented Aug. 26, 1924.

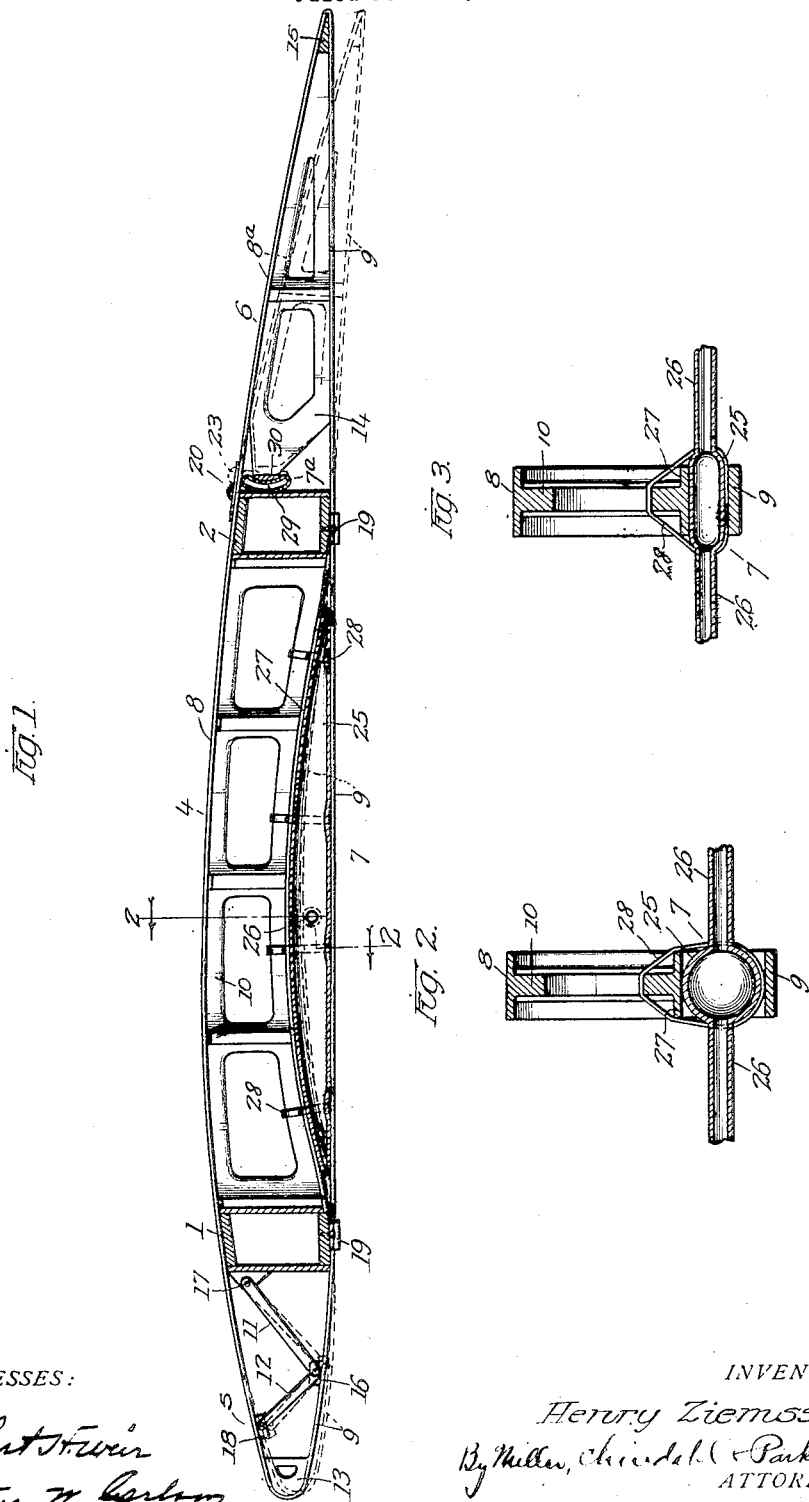

1,506,146

UNITED STATES PATENT OFFICE

HENRY ZIEMSS, JR., OF CHICAGO, ILLINOIS.

AEROPLANE.

Application filed February 12, 1919. Serial No. 276,482.

*To all whom it may concern:*

Be it known that I, HENRY ZIEMSS, Jr., a citizen of the United States, residing at Chicago, in the county of Cook and State of Illinois, have invented certain new and useful Improvements in Aeroplanes, of which the following is a specification.

The invention relates to aeroplanes, and has for its object the provision of means of a practical character for effectively varying the curvature or camber of surfaces subjected to the pressure of the air, while the machine is in flight.

In designing an aeroplane, it is usual to adopt for the surfaces of the character indicated, a degree of curvature which will be most effective for all purposes. For example, in designing the aerofoils or wings of the machine, the angle of incidence usually adopted lies somewhere between an angle giving maximum efficiency in climbing power and an angle giving maximum efficiency in speed. Thus it is apparent that under varying conditions of use, as in climbing, where a high lifting power is desirable, and in horizontal flight, where speed is of the utmost importance, the wings fail to give highest efficiency. This and similar difficulties are overcome by my invention, wherein I employ pneumatic means acting between relatively movable members of the parts whose surfaces it is desired to vary; and while the invention is illustrated in connection with the aerofoils or wings of an aeroplane, it will be understood that in its broadest aspect it is not thus limited but may be employed for varying the curvature of such surfaces as may be deemed necessary or desirable.

In the drawings Figure 1 is a vertical sectional view through a wing of an aeroplane embodying the features of my invention. Fig. 2 is an enlarged sectional view taken on line 2—2 of Fig. 1. Fig. 3 is a similar view showing the parts in different relative positions than in Fig. 2. Fig. 4 is a top plan view of a wing section. Fig. 5 is a fragmentary sectional view on an enlarged scale taken in the plane of line 5—5 of Fig. 4. Fig. 6 is a fragmentary plan view showing details of construction.

The wing comprises a forward or main spar 1, a rear spar 2 and a series of ribs 3. Said ribs 3 are made sectional (Fig. 1), each comprising a main or central section 4, a forward or leading edge section 5, and a rear or trailing edge section 6. 7 and 7ª indicate generally pneumatic means capable of moving the sections of the ribs relative to each other whereby to vary the camber of the wing, such means being readily controllable from the pilot's seat so that the camber may be varied while the machine is in flight. Herein, for the sake of clearness, the usual fabric covering for the wing is not shown.

The central rib section 4 is the portion between the forward and rear spars 1 and 2, while the forward section 5 is located forwardly of the main spar 1 and the rear section is located rearwardly of the rear spar 2. Throughout its length each rib has an upper flange 8 and a lower flange 9, and each of the sections is provided with means for spacing said flanges. Thus, the central section 4 has a web portion 10 of preferred construction, the forward section has a pair of pivoted arms 11 and 12 and a nose piece 13, and the rear section has a web 14 and a tail piece 15. The arms 11 and 12 in the leading edge section are pivotally mounted at one end in a common pivot block 16 on the lower flange 9, and are respectively pivoted to the spar 1 and upper flange 8 as at 17 and 18.

For the purpose of enabling the wing to be flexed, two or more of the sections are made relatively movable. Herein both the forward and rear sections are adapted to move with reference to the central section, and to this end the lower flange 9 is mounted for movement longitudinally of the main section 4 and transversely of the spars 1 and 2, by means of straps 19 secured to the under sides of the spars; the web portion 10 of the central rib section is concaved or arched at its lower edge; and the upper flange 8 of the rib is made sectional with a rear portion 8ª having a sliding connection 20 with the rear spar 2 so as to be movable longitudinally relative to the main portion of the flange. The parts are so proportioned and arranged that a movement of the lower flange 9, toward or away from the curved edge of the web 10, will impart a limited amount of movement to the end rib sections 5 and 6, the pivoted arms 11 and 12 of the forward section being adapted to permit such swinging movement of said section.

The connection 20 between the rear upper flange section 8ª and the rear spar 2 may comprise a strap 21 (Fig. 6) secured upon the upper side of the rear spar 2 and having a longitudinal slot 22 therein to receive a pin 23 on the rear section of the flange. For receiving the slot 22, the strap has a portion 24 extending rearwardly over the forward end of the flange section 8ª in which the pin 23 is mounted. Preferably the adjoining ends of the upper flange sections are dovetailed so as to assist in maintaining the relatively moving parts in their proper relationship.

When the machine is in flight, it will be apparent that the pressure of the air upon the under surface of the wing will normally force the lower flange 9 of each of the ribs toward the lower curved edge of the web 10 of the central section, thus drawing the forward and rear sections downwardly. In this position of the parts (Fig. 1, dotted lines, and Fig. 3) the degree of curvature is greatest and therefore gives a maximum climbing power to the wings. When the machine is in horizontal flight, however, it is desirable, as above stated, to decrease the curvature or camber of the wings. This is accomplished by the pneumatic means 7 comprising a tube 25 of rubber or the like positioned between the lower flange 9 and the web portion 10 of the central rib section, each tube being provided with suitable connections 26 by means of which they may be connected with each other and with a suitable source of supply (not shown) of compressed air. Preferably the lower edge of the web 10 of the central section is provided with a bearing flange 27 (Figs. 2 and 3), and the tube 25 may be held in position between said flange and the lower rib flange 9 by means of bands 28 of tape or the like, extending around the tube and the bearing flange 27, the bands being passed through suitable openings in web 10 (Fig. 2). The bands thus do not interfere with the movements of the lower rib flange 9.

It will be seen that when the tube 25 of each of the variable camber ribs is inflated, the central portion of the lower rib flange 9 will be forced downwardly, thus assisting the pressure of the air upon the forward and rear sections to move them upwardly, so that the various sections of the ribs may be caused to assume during flight the positions shown in full lines in Fig. 1. By this means a decreased curvature of the wings may be readily obtained for speed purposes.

The pneumatic means 7ª may be employed in combination with the means 7, or if desired may be used separately therefrom. This means comprises a tube 29 extending longitudinally of the wing and suitably secured in position between the rear spar 2 and an elongated bearing member 30 secured on the forward ends of the webs 14 of the rear rib sections, as near the top flanges 8ª as possible, the forward ends of said webs 14 being suitably shaped as at 31 (Fig. 5) for this purpose. It will be seen that by inflating the tube 29 the rear wing section may be swung downwardly to increase the camber of the wing. When the lower flange 9 is made slidable relative to the rear spar 2, such inflation of the tube 29 merely serves to augment the pressure of the air upon the under surface of the central portion of the wing, forcing the central portions of the lower flanges 9 upwardly; but it will be understood that the operation of the rear wing section by the means 7ª is not dependent upon the sliding connection of the lower flange 9 of the rear spar 2.

From the foregoing description it will be apparent that I have provided means of a very practical character for effecting a variation in the curvature of surfaces subjected to continuous pressure of the air. The pneumatic means 7 and 7ª are adapted to be readily operated by the pilot to produce the degrees of curvature which will be most efficient for climbing purposes as well as for speed; and by properly regulating the amount of air pressure within the tubes it will be seen that the pressure of the air upon the wings may be made to automatically vary the camber to meet the requirements of the machine, the rib sections being caused to swing against the action of the air in the tubes to a greater or less extent, depending upon the degree of pressure to which the wing is subjected. For example, the air within the tubes may be maintained at such a state of compression that when the machine is climbing, the extreme pressure of the air upon the under surface of the central wing portion will force the central portions of the flanges 9 upwardly against the action of the tubes and thereby increase the camber of the wing; and when the pressure upon the wing decreases, as in horizontal flight, the pressure in the tubes will be such as to cause a decrease in camber of the wing.

It will be noted that the aerofoil section shown in full lines in Fig. 1 is a very fast section which will give a maximum lift-drift ratio at small angles of incidence and operate at its best efficiency with a small lift coefficient.

On the other hand the section shown in dotted lines is very similar to the R. A. F. No. 6 except that the lower surface has a slight central indentation due to the rear spar being a trifle thicker than the depth of the central rib section. Such a section will give slightly higher lift coefficients than the R. A. F. No. 6, attaining a slightly smaller maximum lift-drift ratio but giving good values for this ratio over a slightly wider range of incidence angles.

The portion of the leading edge in front of the pivotal connections at 16 and 18 may be considered semi-rigid as the only deformation occurring will be that due to the resilience of the flange portions which, when they are distorted into the dotted line position, extend past the connections at 16 and 18 at slightly different angles. The resilience of the upper flange will make the upper surface of the leading edge a trifle more convex throughout its entire length and the convexity of the lower surface in front of the front spar will be decreased. This change harmonizes with the alterations taking place simultaneously in the central and trailing edge portions of the section.

It will also be apparent that in a gusty wind the resilience of my improved aerofoil permits it to store energy in the compressed air within the tubes rather than by putting some of the structure of the wing under mechanical stress.

This has two important advantages: first, no part of the mechanical structure of the wing the strength of which is relied on, is repeatedly stressed so as to fatigue the material, and second, the load-displacement curve of any of the resiliently supported parts is not a straight line, as the resilient medium employed does not follow Hooke's law. This is due not only to the fact that upon momentary oscillations of pressure the air in the tubes will act practically adiabatically, but also to the well known fact that in compressing a cylindrical tube the area of contact of the member engaging the tube increases as the tube flattens. The resilient properties of the wing in flight are therefore materially different from those of a wing in which changes of shape are accomplished by the use of springs or by allowing the structure of the wing itself to flex.

It will also be obvious that by varying the relative curvatures of the wings on opposite sides the pilot may obtain lateral control.

While I have herein described the invention with considerable particularity, it will be understood that I do not intend to be limited in the interpretation of the appended claims to the construction and arrangements set forth except as may be necessitated by the state of the prior art.

I claim as my invention:

1. In an aeroplane, a variable camber wing comprising a front spar, a rear spar, and a plurality of ribs each comprising a central section, a forward section and a rear section, said sections including upper and lower flange portions and means for spacing said flange portions apart, the upper flange portion of the rear section having a sliding connection with the rear spar and the lower flange portions of each of the sections having sliding connections with the forward and rear spars, and a pneumatic tube entered between the lower flange portion of the central section and the spacing means thereof, said tube having a connection for admitting and exhausting air under pressure.

2. In an aeroplane, a variable camber wing including a spar and a plurality of ribs each comprising a main section and a rear section, each of said rib sections having upper and lower flange portions and means for spacing said flange portions apart, the upper flange portion of the rear section and the lower flange portions of both sections being slidable relative to the spar, a pair of pneumatic tubes entered respectively between the lower flange portion of the central section and the spacing means thereof, and between the spar and the spacing means of the rear section, said tubes each having a connection for admitting and exhausting air under pressure.

3. In an aeroplane, a variable camber wing comprising a spar, and a plurality of ribs each comprising a main section and an end section, said end section having upper and lower flange portions and means for spacing said flange portions apart, said upper flange portion being slidable relative to the spar, a pneumatic tube extending longitudinally of the spar, and a longitudinal bearing member on the end section against which said tube is adapted to bear, said tube having a connection for admitting and exhausting air under pressure.

4. An aerofoil rib having, in combination, a rigid central section, leading and trailing edge sections movable with respect to said central section, a flexible but non-extensible member extending across the lower surfaces of all said sections, and means associated with said central section for varying the curvature of said member.

5. In an aeroplane, a variable camber wing including a spar and a plurality of ribs each comprising a main section and an end section, said main section having a web with a concave lower edge, a lower flange for said section having a sliding connection with said spar, means entered between said web and said flange and adapted to regulate the curvature of the flange, said lower flange forming a connection between the sections for tipping the end section when the curvature of the central portion is increased.

6. In an aeroplane, a variable camber wing including a spar and a plurality of ribs each comprising a main section and an end section, said end section comprising an upper and a lower flange, an edge member to which said flanges are fixed, arms pivotally mounted between the spar and the lower flange, said lower flange having a sliding connection with said spar, and means for controlling the position of said lower flange with reference to said spar.

7. An aerofoil rib having, in combination, a rigid central section, leading and trailing edge sections movable with respect to said central section, a flexible but non-extensible member extending across the lower surfaces of all said sections, and means associated with said central section for varying the curvature of said member, the contraction and extension of said member caused by changing its curvature in the central section operating to produce relative movement between the central section and the other sections.

8. In an aerofoil, in combination, a front spar a leading edge strip, resilient upper and lower flanges extending from said front spar to said edge strip, one of said flanges having a sliding connection with said front spar and extending beyond same, and means for sliding said flange by varying the curvature of the portion extending beyond said front spar.

9. In an aerofoil, in combination, a front spar, a leading edge strip, resilient upper and lower flanges extending from said front spar to said edge strip, one of said flanges having a sliding connection with said front spar, and means for sliding said flange, a brace having pivotal connection with both said flanges intermediate said front spar and said leading edge strip and another brace having pivotal connection with said front spar and with said first-mentioned brace.

10. In an aerofoil, in combination, a front spar, a leading edge strip, resilient upper and lower flanges extending from said front spar to said edge strip, one of said flanges having a sliding connection with said front spar, and means for sliding said flange, a brace having pivotal connection with both said flanges intermediate said front spar and said leading edge strip and another brace having pivotal connection with said front spar and with said first-mentioned brace, at its point of connection with said slidable flange.

11. In an aerofoil, in combination, a front spar, a rear spar, a rigid rib section between said spars, the lower edge of said rib section having a deep camber, a flexible but non-extensible flange member defining the lower surface of the aerofoil, and pneumatic cushioning means for varying the curvature of the central section of the lower surface of the aerofoil.

12. An aerofoil having, in combination, a front spar, a rear spar, a relatively rigid upper surface structure between said spars, a movable leading edge and a movable trailing edge, and means operating by changing the curvature of the lower surface of the central section for simultaneously shifting said leading and trailing edges.

13. An aerofoil having, in combination, a front spar, a rear spar, a flexibly supported leading edge, pneumatic means for flexing said leading edge and a pneumatically supported trailing edge.

14. An aerofoil having, in combination, a front spar, a rear spar, a movable trailing edge and two different pneumatic means for moving said trailing edge.

15. An aerofoil having, in combination, a front spar, a rear spar, a movable trailing edge and two different pneumatic means for moving said trailing edge, one of said pneumatic means operating directly on said trailing edge and the other operating simultaneously to vary the camber of the central section between said spars.

16. An aerofoil having, in combination, a comparatively rigid central section extending between the front and rear spars, a trailing edge section, a leading edge piece, resilient top and bottom strips spacing said leading edge piece from the front spar, said bottom strip extending rearwardly to define the lower surfaces of said central section and said trailing edge section, pneumatic means for varying the camber of the lower surface of the central section whereby the relative positions of the leading and trailing edge sections are also altered, and pneumatic cushion means carried by the rear spar adjacent to the upper surface for positioning said trailing edge section independently of other control means.

17. An aerofoil having, in combination, a comparatively rigid central section extending between the front and rear spars, a trailing edge section, a leading edge piece, resilient top and bottom strips spacing said leading edge piece from the front spar, said bottom strip extending rearwardly to define the lower surfaces of said central section and said trailing edge section, pneumatic means for varying the camber of the lower surface of the central section whereby the relative positions of the leading and trailing edge sections are also altered, and additional means for positioning said trailing edge section independently of other control means.

18. An aerofoil having, in combination, a comparatively rigid central section extending between the front and rear spars, a trailing edge section, a leading edge piece, resilient top and bottom strips spacing said leading edge piece from the front spar, said bottom strip extending rearwardly to define the lower surfaces of said central section and said trailing edge section, and pneumatic means for varying the camber of the lower surface of the central section whereby the relative positions of the leading and trailing edge sections are also altered.

19. An aerofoil having, in combination, a comparatively rigid central section extending between the front and rear spars, a trailing edge section, a leading edge piece, resilient top and bottom strips spacing said leading edge piece from the front spar, said bottom strip extending rearwardly to define the lower surfaces of said central section and said trailing edge section, and means for varying the camber of the lower surface of the central section, whereby the relative positions of the leading and trailing edge sections are also altered.

20. An aerofoil comprising, in combination, a comparatively rigid central section, a trailing edge section, a semi-rigid leading edge section, a flexible but non-extensible strip of material defining the lower surface of the leading edge section and extending across under the central section to define the lower surface of the trailing edge section also, whereby distortions of the leading edge section due to air currents operate to automatically readjust the lower surface of the central section and the trailing section 21. An aerofoil comprising, in combination, a comparatively rigid central section, a comparatively rigid trailing edge section movable with respect to the central section, a semi-rigid leading edge section, a flexible but non-extensible strip of material defining the lower surface of the leading edge section, and extending across under the central section to define the lower surface of the trailing edge section also, whereby distortions of the leading edge section due to air currents operate to automatically readjust the lower surface of the central section and the position of the trailing section.

22. An aerofoil comprising, in combination, a comparatively rigid central section, a semi-rigid leading edge section, a flexible but non-extensible strip of material defining the lower surface of the leading edge section and extending across under the central section and exposed throughout its length to the dynamic reaction developed on the aerofoil, whereby variations in the reaction on either the leading edge section or the lower surface of the central section, will operate to readjust the shape of both said lower surface and said leading edge section.

23. An aerofoil having, in combination, a comparatively rigid central section, a comparatively rigid trailing edge section, a semi-rigid leading edge section, a flexible but non-extensible strip of material defining the lower surface of the leading edge section and extending across under the central section to merge into the lower surface of the trailing edge section, said strip being exposed throughout its length to the dynamic reaction developed on the aerofoil, whereby any variation in reaction on the leading edge section, the lower surface of the central section or the trailing section will operate to readjust both said leading and trailing sections and the lower surface of said central section, pneumatic means under the control of the operator acting in opposition to the dynamic reaction on the under surface of the central section, additional pneumatic means forming a buffer between the rear spar and the trailing sections, and means for varying the pressure in said buffer to give the operator additional control of the trailing section.

24. An aerofoil having, in combination, a comparatively rigid central section, a comparatively rigid trailing edge section, a semi-rigid leading edge section, a flexible but non-extensible strip of material defining the lower surface of the leading edge section and extending across under the central section to merge into the lower surface of the trailing edge section, said strip being exposed throughout its length to the dynamic reaction developed on the aerofoil, whereby any variation in reaction on the leading edge section, the lower surface of the central section or the trailing section will operate to readjust both said leading and trailing sections and the lower surface of said central section, and pneumatic means under the control of the operator acting in opposition to the dynamic reaction on the under surface of the central section.

25. An aerofoil having, in combination, a comparatively rigid central section, a comparatively rigid trailing edge section, a flexible but non-extensible strip of material defining the lower surface of the central section and merging into the lower surface of the trailing edge section, said strip being exposed throughout its length to the dynamic reaction developed on the aerofoil, whereby any variation in reaction on the lower surface of the central section or the trailing section will operate to readjust both said trailing section and the lower surface of said central section, means forming in effect a shiftable pivotal connection between the rear spar and the trailing section, and means for shifting said pivotal connection to give the operator control of the trailing section.

26. An aerofoil having, in combination, a comparatively rigid central section, a comparatively rigid trailing edge section, a flexible but non-extensible strip of material defining the lower surface of the central section and merging into the lower surface of the trailing edge section, said strip being exposed throughout its length to the dynamic reaction developed on the aerofoil, whereby any variation in reaction on the lower surface of the central section or the trailing section will operate to readjust both said trailing section and the lower surface of said central section, pneumatic means under the control of the operator acting in opposition to the dynamic reaction on the under surface of the central section, means forming in effect a shiftable pivotal connection between the rear spar and the trailing section, and means for shifting said pivotal connection to give the operator additional control of the trailing section.

27. An aerofoil having, in combination, a comparatively rigid central section, a comparatively rigid controlling edge section, a semi-rigid leading edge section, a flexible but non-extensible strip of material defining the lower surface of the leading edge section and extending across under the central section to merge into the lower surface of the controlling edge section, said strip being exposed throughout its length to the dynamic reaction developed on the aerofoil, whereby any variation in reaction on the leading edge section, the lower surface of the central section or the trailing section will operate to readjust both said leading and trailing sections and the lower surface of said central section.

28. An aerofoil having, in combination, a comparatively rigid central section extending from the front spar to the rear spar, a comparatively rigid trailing section, a single positioning means affected by the dynamic reactions on the upper and on the lower surface of the aerofoil in front of the front spar, by the dynamic reaction on the lower surface of the central section of the aerofoil, by resilient means normally under the control of the operator normally acting in opposition to the dynamic reaction on the under side of the central section, and by the total dynamic reaction on both surfaces of the trailing section, said positioning means being connected to the trailing section to affect the position thereof and in its response to the dynamic reactions stated permitting change in the surfaces subjected to said reactions, and additional means entirely under the control of the operator for changing the position of the trailing section.

29. An aerofoil having, in combination, a comparatively rigid central section extending from the front spar to the rear spar, a comparatively rigid trailing section, a positioning means affected by the dynamic reaction on the surface of the aerofoil in its response to the said dynamic reactions permitting change in the surfaces subjected to said reactions, and a connection between said positioning means and the trailing section for changing the position of the trailing section.

30. An aerofoil having, in combination, a comparatively rigid central section extending from the front spar to the rear spar, a comparatively rigid trailing section, a single positioning means affected by the dynamic reactions on the upper and on the lower surface of the aerofoil in front of the front spar, by the dynamic reaction on the lower surface of the central section of the aerofoil and by resilient means normally under the control of the operator normally acting in opposition to the dynamic reaction on the under side of the central section, said positioning means being connected to the trailing section to affect the position thereof and in its response to the dynamic reactions stated permitting change in the surfaces subjected to said reactions, and additional means entirely under the control of the operator for changing the position of the trailing section.

31. An aerofoil having, in combination, a comparatively rigid central section extending substantially from the front spar to the rear spar, a comparatively rigid trailing section, a single positioning means affected by the dynamic reactions on the upper and on the lower surface of the aerofoil in front of the front spar, by the dynamic reaction on the lower surface of the central section of the aerofoil, resilient means normally under the control of the operator normally acting in opposition to the dynamic reaction on the under side of the central section, said positioning means being connected to the trailing section to affect the position thereof.

32. An aerofoil having, in combination, a comparatively rigid central section extending substantially from the front spar to the rear spar, a comparatively rigid trailing section, a positioning means affected by the dynamic reaction on the lower surface of the central section of the aerofoil and connected to the trailing section to affect the position thereof and in its response to the said dynamic reaction permitting change in the surface subjected to said reaction.

33. In aero-dynamic apparatus, an aerofoil, means operating primarily to raise and lower the trailing edge of the aerofoil, a second means operating primarily to readjust the contour of the aerofoil as a whole, and a connection between said first and second means whereby operation of either will result in a slight readjustment of the other in a direction to cooperate with the effect produced by the means operated.

34. In aero-dynamic apparatus, an aerofoil, means operating primarily to change the contour of a relatively small portion of the aerofoil, a second means operating primarily to readjust the contour of the aerofoil as a whole, and a connection between said first and second means whereby operation of either will result in a slight readjustment of the other in a direction to cooperate with the effect produced by the means operated.

35. In aero-dynamic apparatus, an aerofoil, two different sets of control means each operating primarily to produce an effect different from that of the other on the dynamic reactions developed by said aerofoil, and a connection between said two sets of means whereby operation of either set of means produces a relatively slight readjustment of the other in a direction to cooperate with the effect produced by the means operated.

36. In aero-dynamic apparatus, two different sets of control means each operating primarily to produce an effect different from that of the other, and a connection between said two sets of means whereby operation of either set of means produces a relatively slight readjustment of the other means in a direction to cooperate with the effect produced by the means operated.

37. In a device of the class described, a centrally located supporting structure, supporting structures located in front and to the rear of said centrally located structure and capable of relative movement with respect to the same, and a connection between said front and rear structures for effecting simultaneous movement of both, said connection comprising a strip of material extending continuously from said front structure along the bottom of said centrally located structure to said rear structure, and pneumatic means for varying the effective length of said connection by changing its curvature underneath the central structure, to change the relation between the relative positions of the front and rear structures in various conditions of adjustment.

38. In a device of the class described, a centrally located supporting structure, supporting structures located in front and to the rear of said centrally located structure and capable of relative movement with respect to the same, and a connection between said front and rear structures for effecting simultaneous movement of both, said connection comprising a strip of material extending continuously from said front structure along the bottom of said centrally located structure to said rear structure, and means for varying the effective length of said connection by changing its curvature underneath the central structure, to change the relation between the relative positions of the front and rear structures in various conditions of adjustment.

39. In a device of the class described, a centrally located supporting structure, supporting structures located in front and to the rear of said centrally located structure and capable of relative movement with respect to the same, and a connection between said front and rear structures for effecting simultaneous movement of both, said connection comprising a strip of material extending continuously from said front structure along the bottom of said centrally located structure to said rear structure, and pneumatic means for varying the effective length of said connection to change the relation between the relative positions of the front and rear structures in various conditions of adjustment.

40. In a device of the class described, a centrally located supporting structure, supporting structures located in front and to the rear of said centrally located structure and capable of relative movement with respect to the same, and a connection between said front and rear structures for effecting simultaneous movement of both, said connection comprising a strip of material extending continuously from said front structure along the bottom of said centrally located structure to said rear structure.

In testimony whereof, I have hereunto set my hand.

HENRY ZIEMSS, Jr.